(12) United States Patent
Han et al.

(10) Patent No.: US 11,877,018 B2
(45) Date of Patent: Jan. 16, 2024

(54) LIVE VIDEO INGEST SYSTEM AND METHOD

(71) Applicant: KOREA ADVANCED INSTITUTE OF SCIENCE AND TECHNOLOGY, Daejeon (KR)

(72) Inventors: Dong Su Han, Daejeon (KR); Jae Hong Kim, Daejeon (KR); Young Mok Jung, Daejeon (KR); Hyun Ho Yeo, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 215 days.

(21) Appl. No.: 17/265,680

(22) PCT Filed: Nov. 5, 2020

(86) PCT No.: PCT/KR2020/015370
§ 371 (c)(1),
(2) Date: Feb. 3, 2021

(87) PCT Pub. No.: WO2021/096159
PCT Pub. Date: May 20, 2021

(65) Prior Publication Data
US 2022/0368965 A1 Nov. 17, 2022

(30) Foreign Application Priority Data

Nov. 15, 2019 (KR) .................. 10-2019-0146875
Aug. 20, 2020 (KR) .................. 10-2020-0104886

(51) Int. Cl.
H04N 21/2343 (2011.01)
H04N 21/2187 (2011.01)
(Continued)

(52) U.S. Cl.
CPC . H04N 21/234363 (2013.01); H04N 21/2187 (2013.01); H04N 21/2385 (2013.01); H04N 21/251 (2013.01)

(58) Field of Classification Search
CPC ....... H04N 21/234363; H04N 21/2187; H04N 21/2385; H04N 21/251
See application file for complete search history.

(56) References Cited

U.S. PATENT DOCUMENTS 9,686,497 B1 * 6/2017 Terry .................. H04N 7/152
10,701,394 B1 * 6/2020 Caballero ............. G06N 3/045
(Continued)

FOREIGN PATENT DOCUMENTS

CN 110087092 A 8/2019
KR 10-2006-0083298 A 7/2006
KR 10-2019-0117416 A 10/2019

OTHER PUBLICATIONS

Xiaoqi Yin et al., "A Control-Theoretic Approach for Dynamic Adaptive Video Streaming over HTTP", In Proceedings of the 2015 ACM Conference on Special Interest Group on Data Communication, 2015, pp. 325-338.
(Continued)

Primary Examiner — Michael R Telan
(74) Attorney, Agent, or Firm — Sughrue Mion, PLLC

(57) ABSTRACT

The present disclosure in some embodiments provides a system for and a method of providing a live video in real-time by transmitting the live video and patches which are a fraction of a frame of the live video by allocating and using bandwidth for transmitting the live video and bandwidth for transmitting the patches, respectively, and by subjecting, based on the patches, a deep neural network-
(Continued)

based super-resolution model to online learning and thereby super-resolution processing the live video into a super-resolution live video.

25 Claims, 15 Drawing Sheets

(51) Int. Cl.
*H04N 21/2385* (2011.01)
*H04N 21/25* (2011.01)

(56) References Cited

U.S. PATENT DOCUMENTS

| | | | | |
|---|---|---|---|---|
| 2004/0184523 | A1* | 9/2004 | Dawson | H04N 21/6377 348/E7.071 |
| 2016/0088322 | A1* | 3/2016 | Horev | H04N 21/2402 725/14 |
| 2018/0130177 | A1 | 5/2018 | Wang et al. | |
| 2018/0338159 | A1* | 11/2018 | Kapoor | H04N 23/6811 |
| 2019/0096032 | A1 | 3/2019 | Li | |
| 2019/0206026 | A1* | 7/2019 | Vemulapalli | G06T 7/248 |
| 2020/0349686 | A1* | 11/2020 | Shapovalova | H04N 19/86 |
| 2021/0092462 | A1* | 3/2021 | Cox | H04N 21/4621 |
| 2021/0097646 | A1 | 4/2021 | Choi et al. | |
| 2021/0160556 | A1* | 5/2021 | Jang | G06N 3/04 |

OTHER PUBLICATIONS

Hyunho Yeo, et al., "Neural Adaptive Content-aware Internet Video Delivery", In 13th {USENIX} Symposium on Operating Systems Design and Implementation ({OSDI} 18), 2018, pp. 645-661.

Mallesham Dasari, et al., "Streaming 360-Degree Videos Using Super-Resolution", In Proceedings of the IEEE International Conference on Computer Communications (INFOCOM), 10 pages.

Communication dated Mar. 22, 2021, issued by the Korean Intellectual Property Office in Korean Application No. 10-2020-0104886.

Extended European Search Report dated Oct. 17, 2023, issued in European Application No. 20855895.7.

* cited by examiner

LIVE VIDEO INGEST SYSTEM AND METHOD

CROSS-REFERENCE TO THE RELATED APPLICATIONS

This application is a National Stage of International Application No. PCT/KR2020/015370 filed Nov. 5, 2020, claiming priorities based on Korean Patent Application No. 10-2019-0146875 filed Nov. 15, 2019 and Korean Patent Application No. 10-2020-0104886 filed Aug. 20, 2020, the disclosures of which are incorporated by reference herein in their entireties.

TECHNICAL FIELD

The present disclosure in some embodiments relates to a live video ingest system and a live video ingest method.

BACKGROUND

The statements in this section merely provide background information related to the present disclosure and do not necessarily constitute prior art.

A live video streaming system is divided into an ingest side and a distribution side.

At the ingest side, a streamer processes, e.g., encodes a live video shot by an image capture device such as a camera and transmits it to a media server. In this case, to provide a high-resolution streaming service, the live video transmitted to the media server needs to be a high-resolution video. Therefore, the quality of the streaming service depends on the live video transmission environment of the streamer, such as bandwidth, the computing capacity of the streamer terminal, and the like.

On the distribution side, a content distribution server receives the live video from the media server and transmits the same to each terminal of the viewer requesting the streaming service. To optimize the user's quality of experience (QoE), the content distribution server performs adaptive bitrate streaming in consideration of the viewer's requested resolution or video transmission environment. However, it has been difficult to provide live videos with a resolution requested by viewers in real-time with adaptive bitrate streaming alone. Conventionally, when the live video transmission bandwidth of the streamer device is insufficient, or when the encoding operation capacity of the streamer device is limited, the media server receives low-resolution live videos at best, and thus there were limitations to the resolution of the video to be uploaded to the media server. This unduly limited not only the selection of a video resolution that can be provided by adaptive bitrate streaming but also the resolution of a video received by a viewer terminal. This is a case where, even with sufficient bandwidth for the viewer terminal to receive the high-resolution video, the viewer is deprived of the pleasure of viewing the high-resolution video.

In recent years, a study has been made on a neural-enhanced video that involves a neural network-based super-resolution process performed on a video (see Non-Patent Document 1). However, the conventional neural-enhanced video research concerns methods of providing a video on demand (VOD) service by using a pre-trained neural network model (see Non-Patent Documents 1 and 2), which are difficult to apply to streaming services that require live videos to be ingested and distributed in real-time.

Accordingly, in the provision of streaming services, a system is needed to be able to present live videos of various resolutions including a super-resolution video by lowering the dependency on the transmission environment of streamers and the performance constraints of terminals and complying with various needs of viewers.

PRIOR ART LITERATURE

Non-Patent Documents (Non-Patent Document 1) Hyunho Yeo, Youngmok Jung, Jaehong Kim, Jinwoo Shin, and Dongsu Han, 2018. Neural adaptive content-aware internet video delivery. In 13th {USENIX} Symposium on Operating Systems Design and Implementation ({OSDI} 18). 645-661.

(Non-Patent Document 2) M. Dasari, A. Bhattacharya, S. Vargas, P. Sahu, A. Balasubramanian, and S. R. Das. 2020. Streaming 360 Videos using Super-resolution. In Proceedings of the IEEE International Conference on Computer Communications (INFOCOM).

(Non-Patent Document 3) Xiaoqi Yin, Abhishek Jindal, Vyas Sekar, and Bruno Sinopoli. 2015. A control theoretic approach for dynamic adaptive video streaming over HTTP. In Proceedings of the 2015 ACM Conference on Special Interest Group on Data Communication, 325-338.

DISCLOSURE

Technical Problem

The present disclosure in some embodiments seeks to provide a system for and a method of providing a high-resolution live video in real-time unrestricted by the transmission environment of the streamer and the performance limitation of the terminal by transmitting the live video and patches which are a fraction of a frame of the live video by allocating and using bandwidth for transmitting the live video and bandwidth for transmitting the patches, respectively, and by subjecting, based on the patches, a deep neural network-based super-resolution model to online learning and thereby super-resolution processing the live video into a super-resolution live video.

SUMMARY

At least one aspect of the present disclosure provides a live video ingest system for real-time streaming including an ingest device and a media server. The ingest device is configured to generate sampled patches by sampling patches which are a fraction of a frame of a live video generated by an image capture device and to transmit the sampled patches and the live video by allocating and using bandwidth for transmitting the sampled patches and bandwidth for transmitting the live video, respectively. The media server is configured to receive the sampled patches and the live video from the ingest device, to perform online-learning, based on the sampled patches, on a super-resolution model (SR model) that is a deep neural network-based super-resolution model, and to use the super-resolution model for super-resolution processing the live video into a super-resolution live video.

Another aspect of the present disclosure provides a live video ingest system wherein the ingest device includes a patch sampler configured to sample, from a raw frame of the live video, patches which are a fraction of the raw frame, and a quality optimization scheduler configured to allocate all or part of available bandwidth as the bandwidth for transmitting sampled patches and the bandwidth for transmitting the live video, and wherein the media server includes a content-adaptive trainer configured to subject the super-resolution model to the online learning by using the sampled patches as ground truth, and a super-resolution processor configured to use the super-resolution model for performing the super-resolution processing on the live video into the super-resolution live video.

Yet another aspect of the present disclosure provides a live video ingest method performed by a live video ingest system for real-time streaming, the live video ingest method including capturing a live video by an image capture device, and receiving, by an ingest device, one or more raw frames of the live video from the image capture device and sampling, by the ingest device, a fraction of the raw frame as patches, and allocating, by the ingest device, all or part of an available bandwidth as a bandwidth for transmitting sampled patches and a bandwidth for transmitting the live video, respectively, and receiving, by a media server, the live video and the sampled patches from the ingest device, and training, by the media server, a super-resolution model (SR model) that is a deep neural network-based super-resolution model by subjecting the super-resolution model to an online learning by using the sampled patches as ground truth, and performing, by the media server, a super-resolution process on the live video into a super-resolution live video by using the super-resolution model.

Yet another aspect of the present disclosure provides a live video ingest system wherein the quality optimization scheduler includes a bandwidth measurer configured to estimate the available bandwidth, and a bandwidth allocator configured to allocate all or part of the available bandwidth by calculating the bandwidth for transmitting the sampled patches and the bandwidth for transmitting the live video.

Yet another aspect of the present disclosure provides a live video ingest system wherein the content-adaptive trainer is configured to train the super-resolution model by giving a larger weight to preset K (K is a natural number) most recent patches among the sampled patches relative to remaining patches after the preset K most recent patches.

Yet another aspect of the present disclosure provides a live video ingest system wherein the content-adaptive trainer further includes a saturation detector configured to detect a quality gain saturation by monitoring a quality gain of the super-resolution model dependent on the training, a learning unit configured to train the super-resolution model in consideration of the quality gain saturation, and a change detector configured to detect a scene change of the live video.

Advantageous Effects

As described above, the present disclosure in some embodiments provides a live video ingest system and a live video ingest method wherein an ingest device sends a media server a live video and patches which are equivalent to a fraction of a frame of the live video by allocating and using bandwidth for transmitting the live video and bandwidth for transmitting the patches, respectively, and wherein the media server utilizes the transmitted patches in receipt as ground truth for training a deep neural network-based super-resolution model by subjecting the same to online learning and thereby super-resolution processing the transmitted live video in receipt into a super-resolution live video.

Accordingly, the live video ingest system of at least one embodiment of the present disclosure overcomes the influence of the transmission environment of the streamer, such as bandwidth, network congestion that impairs the quality of the streaming service, and it performs a super-resolution process by the media server on behalf of terminals with limited computing and power capacities, thereby effecting the provision of a high-resolution live video regardless of the end-to-end environment that is streamers and viewers.

Additionally, the ingest device of the live video ingest system according to at least one embodiment of the present disclosure schedules a bandwidth for transmitting a live video and another bandwidth for transmitting patches, which effects the provision of high-resolution live video to viewers without transmitting such video from the streamer end.

Further, the super-resolution process of the live video ingest system according to at least one embodiment of the present disclosure is performed by utilizing high-resolution patches obtained from the live video as ground truth for training the deep neural network-based super-resolution model to learn online, wherein the learning is adaptive to the performance of the model that is fed back according to the epoch equivalent to the training time, which effects the provision of a reliable high-performance streaming service compared to the pre-trained neural network-based model.

Furthermore, the present disclosure in at least one embodiment is responsive to whether the super-resolution model has a saturation of quality gain dependent on the training or whether the live video has a scene change for changing the transmission bitrate of the patches and thereby performing the super-resolution process adaptively to contents that change in real-time.

Figure 1A:
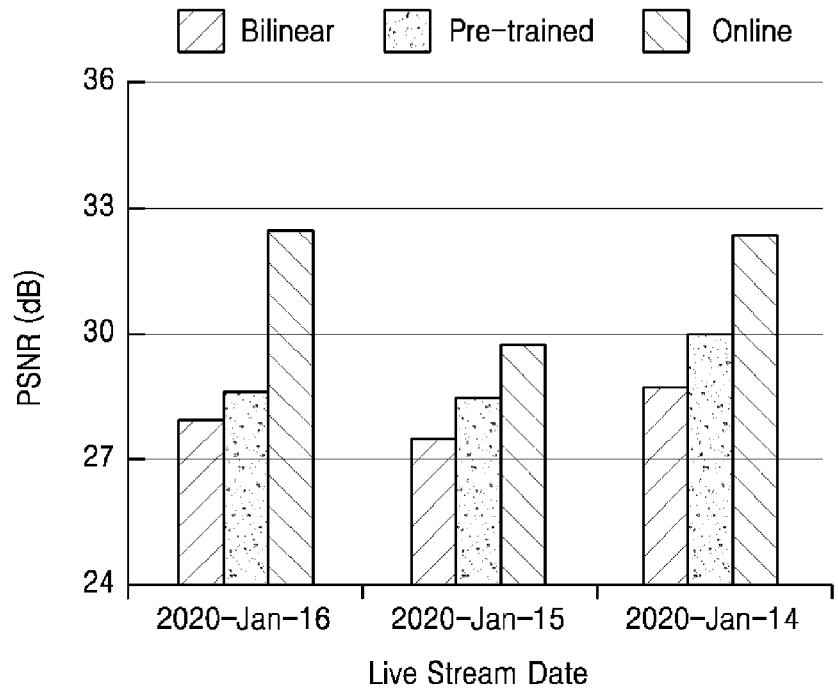
FIGS. 1A and 1B are graphs illustrating the performance of a learning method employed by a super-resolution model according to at least one embodiment of the present disclosure.

| REFERENCE NUMERALS | |
|---|---|
| 20: | live video ingest system |
| 200: | patch sampler |
| 210: | quality optimization scheduler |
| 220: | content-adaptive trainer |
| 230: | super-resolution processor |
| 240: | image capture device |
| 250: | video encoder |
| 260: | pacer |

DETAILED DESCRIPTION

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The detailed description to be disclosed below with the accompanying drawings is intended to describe illustrative embodiments of the present disclosure and is not intended to represent the only embodiments in which the present disclosure can be practiced.

The present disclosure relates to a live video ingest system and a live video ingest method which provide live video in real-time, by sending the media server the live video and patches which are equivalent to a fraction of each live video frame by allocating and using bandwidth for transmitting the live video and bandwidth for transmitting the patches, respectively, and utilizing the transmitted patches as a basis for training a deep neural network-based super-resolution model by subjecting the same to online learning and thereby super-resolution processing the transmitted live video into a super-resolution live video.

In some embodiments of the present disclosure, the term, 'ingest device' refers to a streamer terminal or streamer device and is used for the convenience of description. The ingest device may include all or some of a camera, video encoder, and pacer, which are common devices required to capture and transmit live video to a media server, or it may include those capture and transmit devices implemented as component modules.

The ingest device in some embodiments of the present disclosure is only used to describe the interaction with the live video ingest system of some embodiments or interactions with respective devices included in the live video ingest system or, but it does not constitute the present disclosure.

A media server in the present disclosure is termed to represent a device that super-resolution-processes the live video and transmits the super-resolution live video to a content distribution server or a viewer terminal according to at least one embodiment of the present disclosure, and it is used for the convenience of description but does not constitute an embodiment according to the present disclosure. Such a media server may be implemented as, but not limited to, a device as well as a module in a cloud environment.

Figure 1B:
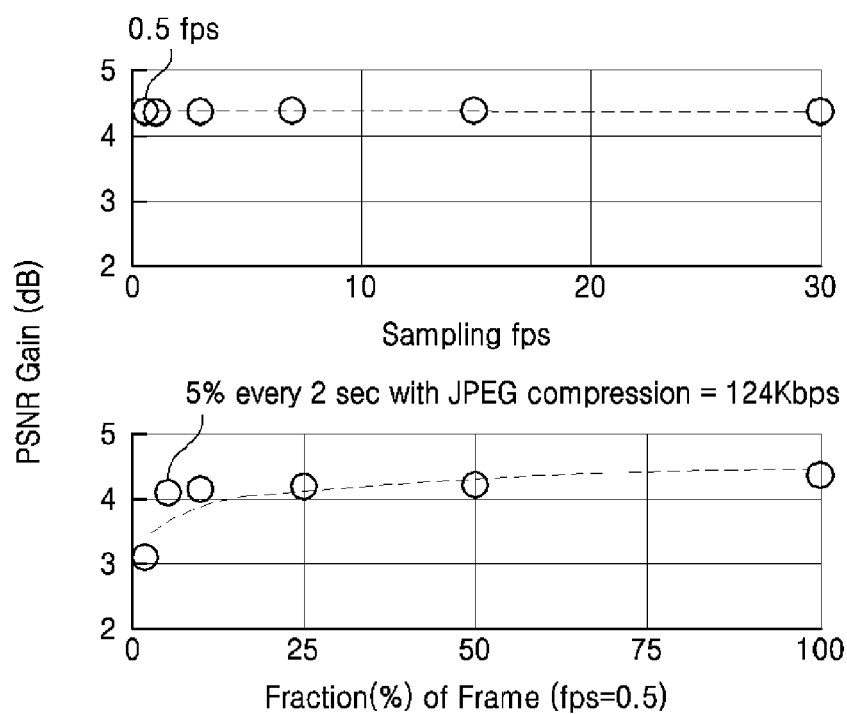

FIGS. 1A and 1B are graphs illustrating the performance of a learning method employed by a super-resolution model according to at least one embodiment of the present disclosure.

Super-resolution processing is a data processing method for converting an image or video of low resolution (LR) into an image or video of high resolution (HR). Used for such a super-resolution process are a simple upscaling (e.g., bilinear upscaling) process to complex content-aware deep neural networks (content-aware DNNs). The present disclosure presents a super-resolution model (SR model) using a deep neural network or DNN-based online learning. Here, online learning means training a model by subjecting the model to learning based on continuously changing training data.

The super-resolution model of some embodiments iteratively learns by using patches, which are fractions of a continuously changing video frame, as training data. With this iterative learning, neural-enhanced learning is achieved that enhances the deep neural network on which the super-resolution model is based.

The patch according to at least one embodiment of the present disclosure may be ground truth for a super-resolution model to learn because it has a high resolution compared to an encoded frame and a small data size, it facilitates transmissions from the ingest device to the media server. According to at least one embodiment of the present disclosure, the learning timing of the super-resolution model is determined in consideration of the quality gain saturation of the model or the scene change of the live video. The learning difficulty of a super-resolution model according to at least one embodiment of the present disclosure may vary depending on a dynamic degree, a length, a scaling factor, and the like of the subject video to learn. Here, the scaling factor refers to how high a low-resolution video, which is an input value, is to be converted to and outputted as a high-resolution video. For example, to output a video in 4K resolution format (in ultra-high definition or UHD resolution) from a video having the resolution of 720 p, the scaling factor is set to 3.

As can be seen in FIG. 1A, the online learning-based super-resolution method exhibits superior peak-signal-to-noise ratio (PSNR) performance over other super-resolution processing methods, bilinear upscaling and content-specific pre-trained neural networks respectively.

The PSNR gains of FIG. 1B are quality gains additionally obtained by subjecting the super-resolution model to the online learning by utilizing the patches extracted from the live video frame as ground truth. As illustrated in FIG. 1B, a certain level of PSNR gains can be obtained from training a super-resolution model by cropping and using fractions equivalent to 5% of each frame obtained by extractions of 1080p video at 0.5 fps. As can be seen in FIG. 1B, the increase in the PSNR gain is insignificant from the section in which the frame cropping ratio is 5% or more. Training all of the sampled frames reduced the PSNR gain by 0.27 dB due to redundant learning.

Therefore, the super-resolution model of the present disclosure is trained in the super-resolution processing through several steps based on a small amount of training data, thereby having a high level of super-resolution performance as shown in FIGS. 1A and 1B.

Figure 2:
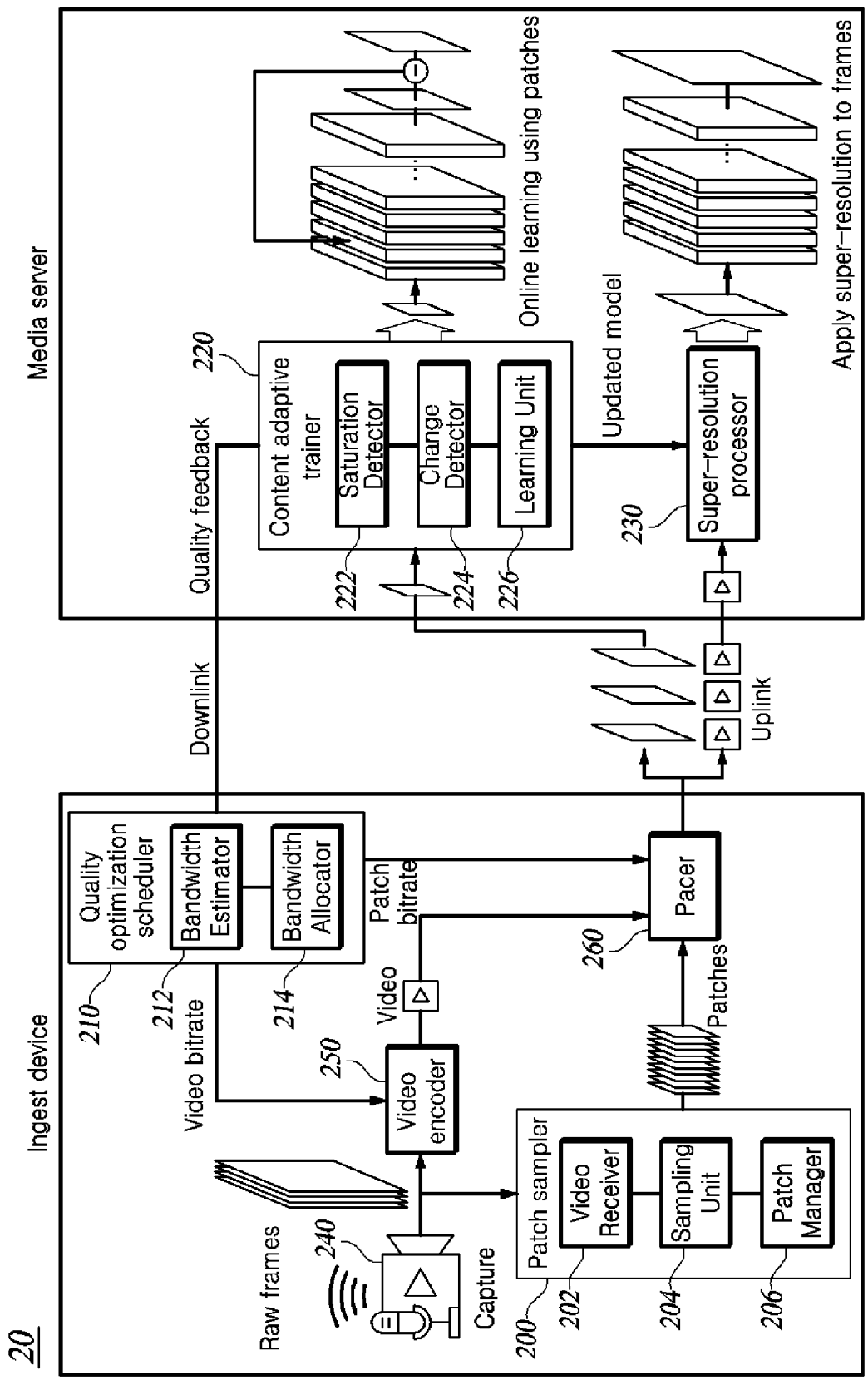
FIG. 2 is a schematic conceptual diagram of a live video ingest system according to at least one embodiment of the present disclosure.

FIG. 2 is a schematic conceptual diagram of a live video ingest system according to at least one embodiment of the present disclosure.

According to at least one embodiment of the present disclosure, a live video ingest system 20 includes an ingest device and a media server, wherein the ingest device is adapted to sample patches from a live video and to transmit the sampled patches along with the live video to the media server, and the media server is adapted to subject, based on the sampled patches, a deep neural network-based super-resolution model to online learning and to use the super-resolution model before, during, and after the online learning for super-resolution processing the live video into a super-resolution live video. Specifically, the ingest device includes all or some of a patch sampler 200, a quality optimization scheduler 210, an image capture device 240, a video encoder 250, and a pacer 260. The media server includes all or some of a content-adaptive trainer 220 and a super-resolution processor 230. However, the live video ingest system 20 shown in FIG. 2 is according to at least one embodiment of the present disclosure, and not all constituents shown in FIG. 2 are essential components, and some constituents may be added, changed, or deleted in other embodiments. For example, the image capture device 240, the video encoder 250, and the pacer 260 according to another embodiment of the present disclosure may be implemented as external devices and may be excluded from the ingest device. The above-described components of the live video ingest system 20 may be implemented as devices or modules that perform functions of the respective components.

In FIG. 2, the patch sampler 200 and the quality optimization scheduler 210 are shown to be included in the ingest device, but in another embodiment, they may not be included in the ingest device and instead be implemented as independent devices or modules included in a device so that they perform their respective functions by communicating with other components of the ingest device.

The patch sampler 200 samples patches from the live video captured in real-time by the image capture device 240. The patch sampler 200 includes all or some of a video receiver 202, a sampler 204, and a patch manager 206. However, not all constituents shown in FIG. 2 are essential components of the patch sampler 200, and some constituents may be added, changed, or deleted in other embodiments. For example, in another embodiment, the patch sampler may further include a patch encoder (not shown) for encoding the sampled patches. In yet another embodiment, the patch sampler may further include a patch transmission buffer to perform patch sampling in response to a buffer being emptied.

The video receiver 202 receives a raw frame of a captured video and/or a frame of an encoded live video from the image capture device 240.

The sampling unit 204 samples a fraction of each raw frame to generate one or more patches. The sampling unit 204 may employ a light-weight sampling method. For example, sampling unit 204 may sample the patches from the most recent raw frame among the raw frames of live video received from the video receiver 202. The sampling unit 204 may perform random sampling so that there is no overlap of patches in consideration of a grid of an entire frame.

The patch manager 206 prioritizes patches of low encoding quality among the sampled patches and includes them in a transmission target to be transmitted to the media server. For example, the patch manager 206 receives the raw frame of the live video and the encoded frame of the encoded live video and samples their patches in the same manner, respectively. By calculating the encoding quality (e.g., PSNR, etc.) of the entire frame before sampling the patches, only such patches that have an encoding quality lower than that calculated for the respective patches may be included in the transmission target. Alternatively, the patch having the lowest encoding quality may be preferentially included in the transmission target. When the minimum number of patches is set, the patch sampler 200 may repeatedly perform patch sampling until the number of patches included in the transmission target reaches the minimum number of patches. The logic for such inclusion in the transmission target only when the encoding quality of the entire frame is lowered than the encoding quality of the entire frame is that the super-resolution performance is better when the super-resolution model is trained based on such a patch.

The patch manager 206 may perform compression of patches included in a transmission target in consideration of the resolution and size of the sampled patches. The sampled patches need to be of sufficient resolution to be the training data of the super-resolution model, and at the same time be of an appropriate size not to occupy an available bandwidth excessively. For example, the patch manager 206 may perform lossless PNG compression on the sampled patches to reduce the size of the sampled patches by about 50% with the resolution maintained. Alternatively, the size of the patches may be reduced to 1/10 while maintaining the quality of the patches at the 95% level by using JPEG95 compression.

The patch manager 206 may include timestamps in the patches included in the transmission target. These timestamps may be those of the raw frame from which the patches were sampled. When the patches with the timestamps included are transmitted, the content-adaptive trainer 220 of the media server may train the super-resolution model in a manner that gives a higher weight to the latest patch based on the timestamp. When the patches are sampled in consideration of the grid of the entire frame, the patch manager 206 may further include location information on the grid of the frame.

The quality optimization scheduler 210 calculates an available bandwidth for transmitting the patches and live video to the media server and allocates the calculated bandwidth separately for patch transmission and live video transmission. The quality optimization scheduler 210 according to at least one embodiment of the present disclosure includes at least one of a bandwidth estimator 212 and a bandwidth allocator 214. However, not all constituents shown in FIG. 2 are essential components of the quality optimization scheduler 210, and some constituents may be added, changed, or deleted in other embodiments.

The bandwidth estimation unit 212 estimates the available bandwidth when it needs to do the same, for example, when the available bandwidth is inconsistent due to constant changes of the communication environment between the ingest device and the media server continuously changes, among other causes. Such bandwidth estimation may be performed by probing a bandwidth in a transport layer of a communication unit (not shown) of the ingest device. Such probing operation may be performed based on, but not limited to, a packet transmission rate or an Ack arrival time difference.

The bandwidth allocating unit 214 allocates all or part of an estimated available bandwidth c separately for patch transmission and live video transmission. Hereinafter, the allocated bandwidths are indicated based on a bitrate, wherein a bitrate for transmitting patches is indicated by p, and a bitrate for transmitting the live video is indicated by v. At a specific point in time t, the bitrate of the available bandwidth is denoted by $c_t$, the bitrate for patch transmission is denoted by $v_t$, and the bitrate for live video transmission is denoted by $p_t$.

The bandwidth allocator 214 allocates bandwidth in consideration of the encoding quality of the live video and the expected quality gain of the super-resolution model to be trained by the transmitted patches. Here, the quality gain means the degree of performance improvement of the super-resolution model following the learning thereof. Very low quality of the transmitted live video limits the super-resolution processing, and too few patches being transmitted may cause a minor performance improvement to be obtained by training the super-resolution model. Therefore, the bandwidth allocating unit 214 preferably determines an optimal bitrate capable of maximizing both the quality of the live video and the expected quality gain. For example, this optimal bitrate may be obtained by Equation 1.

$$\max_{v_t, p_t} Q_{video}(v_t) + \gamma \cdot Q_{DNN}(\Sigma_{k=0}^{t} P_t), s, t, \forall t, v_t + p_t \leq C_t \quad \text{Equation 1}$$

Here, $\gamma$ is an arbitrary discount factor ($\gamma$ is 1 or less). The first term is the quality function of the encoded live video at $v_t$. The second term is a function of the expected quality gain for all the patches from $p_0$ to $p_t$. Metrics for such a quality calculation include, but are not limited to, PSNR and Structural Similarity Index Measure (SSIM), etc. Assuming that the function of each term is concave, to find the optimal bitrate based on Equation 1, the global optimum of Equation 1 needs to be obtained, for which a gradient ascent method may be employed. Equation 2 is obtained by applying the gradient ascent method to Equation 1.

$$p_{t+1} = \alpha \cdot \left\{ \gamma \cdot \frac{dQ_{DNN}}{dp_t} + \frac{dQ_{video}}{dp_t} \right\} + p_t \quad \text{Equation 2}$$

Here, $\alpha$ is a step size of p and is an arbitrary constant value. In this case, $\alpha$ may be expressed based on the transmission rate (bps) of the patch. Such $\alpha$ may be changed as needed. For example, $\alpha$ is desirably set to a value sufficient for the super-resolution model to obtain a quality gain in one epoch (unit of learning time). For instance, $\alpha$=100 kbps.

With $p_{t+1}$ obtained by using Equation 2, $v_{t+1}$ can be obtained by an operation of $c_{t+1} - p_{t+1}$. At this time, $p_{t+1}$ may be obtained by directly calculating the gradient or instantaneous rate of change corresponding to each term of Equation 2, although $p_{t+1}$ may be obtained by obtaining an approximate value of each term.

To obtain the approximate value of the first term in Equation 2 requires information on the expected quality gain at the two most recent points in time, but since the quality gain is information that can be obtained only when it is received from the media server performing the super-resolution process, the bandwidth allocating unit 214 may calculate an expected quality gain upon receiving feedback on the quality gain from the media server. In this case, the duration between the two points in time at which the quality gain is calculated may be set equal to the training epoch. In this case, a quality gain can be obtained subject to sufficient training performed based on the previously transmitted patches. Accordingly, the approximate value of the expected quality gain may be calculated based on the quality gain that has already been received at the two most recent points in time.

The approximate value of the second term of Equation 2 may be obtained by calculating an average rate of change based on the encoding quality at the two most recent points in time. The quality of the live video at the two recent points in time needed to be calculated. However, when the quality of a live video is calculated based on some frames, distortion may be present in the calculated quality value of the live video, so it is preferable to use an average quality of a Group of Pictures (GoP) of the live video. Alternatively, conventional measurements may be used when the ingest device is burdened with encoding or it is difficult to directly calculate the average quality. When there is a difficulty in ingesting conventional measurements, a normalized quality curve of contents similar to a live video up for learning may be used. For example, the approximate value of the second term of Equation 2 may be calculated by scaling $Q_{video}(v_{t-1})$ by a relative difference between $NQ_{video}(v_t)$ and $NQ_{video}(v_{t-1})$. Here, $NQ_{video}(v_t)$ is a quality value on the normalized quality curve at time $v_t$. An example calculation of such an approximate value will be described below referring to FIG. 4.

The bandwidth allocating unit 214 may update each bitrate in a periodic cycle in which the bandwidth estimating unit 212 estimates an available bandwidth. However, such an update period is preferably long enough to obtain the effect of online learning of the super-resolution model and short enough to cope with changes in the network environment. Provided the available bandwidth falls below the minimum encoding bitrate, the transmission is desirably stopped, which is the case, e.g., where this live video ingest system is implemented based on WebRTC and when the available bandwidth falls below the minimum encoding bitrate of 200 kbps.

The content-adaptive trainer 220 of the media server trains the super-resolution model by using the patches received by the media server as ground truth. This training/learning process is classified as both of online-based learning in that it receives and uses patches in real-time (or in a periodic cycle) for performing the learning every epoch and neural-reinforced learning in that it continuously trains a deep neural network-based super-resolution model. According to at least one embodiment of the present disclosure, with respect to a preset K (K is a natural number), the content-adaptive trainer 220 gives a larger weight to the most recent K patches than to other remaining patches, among the transmitted sampled patches, thereby subjecting the super-resolution model to the neural-enhanced learning. In another embodiment, when there are graphics processing unit (GPU) resources of a plurality of GPUs are available for the media server to use, the content-adaptive trainer 220 is adapted to subject the super-resolution model to a distributed learning by generating patch groups with the sampled patches being grouped in an order of arrival at the media server and allocating the GPU resources to the patch groups, respectively.

The content-adaptive trainer 220 may include all or some of a saturation detector 222, a change detector 224, and a learning unit 226 as in FIG. 2, although the illustrated constituents are not the essential components of the content-adaptive trainer 220, and some constituents may be omitted, added, or changed.

The saturation detector 222 detects whether or not the quality gain is saturated according to the learning of the super-resolution model. When the quality gain is saturated, there is no more need for receiving and using the patches for learning. The algorithm for detecting the saturation of the quality gain will be described below in Table 1.

The change detector 224 detects a scene change of the received live video. At the time of scene change, since it is difficult to properly perform super-resolution processing with the previous super-resolution model, the super-resolution model needs to be updated. The algorithm for detecting the scene change will follow as in Table 1.

TABLE 1

```
set initial STATE as Training;
repeat
    switch STATE
        case Training
            for each training epoch
                Compute diff of Q_DNN(t) and Q_DNN(t-1);
                if diff < thresh _sat
                    patience += 1;
                    if patience > count _sat
                        Suspend online training;
                        STATE = Suspended;
                        patience = 0;
                    else
                        patience = 0;
        case Suspended
            for each validation period
                Compute diff Of Q_DNN(t) and Q_DNN(t-0);
                if diff < thresh _online
                    patience += 1;
                    if patience > count _online
                        resume online training;
                        STATE = Training;
                        patience = 0;
                    else
                        patience = 0;
until stream ends;
```

Table 1 shows an algorithm for detecting and coping with a quality gain or a scene change as at least one embodiment of the present disclosure.

The quality gain saturation may be a case where the difference between the quality gains of the super-resolution model at the two most recent time points is equal to or less than the gain saturation limit (thresh$_{sat}$) and falls below the gain saturation limit at such frequency or number of times (represented by patience) that exceed a preset saturation count (count$_{sat}$). In this case, the content-adaptive trainer 220 suspends the learning of the super-resolution model and informs the ingest device of the learning suspension state. At this time, the quality optimization scheduler 210 sets p to a preset minimum value (p$_{min}$) so that the patches are transmitted to the minimum. Further, the patience is initialized to zero.

When a scene change is made while learning of the super-resolution model is suspended, the super-resolution model needs to be newly trained. The scene change may be a case where the difference between the most recent quality gain and the initial quality gain of the super-resolution model is equal to or less than the learning limit (thresh$_{online}$) and falls below the learning limit at such frequency or number of times (represented by patience) that exceed a preset learning count (count$_{online}$). In this case, the content-adaptive trainer 220 resumes learning of the super-resolution model and informs the ingest device of the learning resumption. This resumption may be performed by initializing and retraining some or all of the super-resolution model based on the most recently received patches. The quality optimization scheduler 210 sets p to a preset initial value (p$_{init}$). The patience is initialized to zero.

The learning unit 226 trains, by using the patches as an input value, the super-resolution model to super-resolution process the input patches and thereby output an output value. This training/learning can be performed every epoch, which is a unit of learning time. Additionally, when the quality gain by learning is saturated, learning may be suspended, which may be subsequently resumed when there is a scene change of the live video. Here, the learning suspension may be performed by allocating the available GPU resources to a minimum or not allocating GPU resources. The initial training data of the initialized super-resolution model may be a result of training other live video(s) or a standard benchmark dataset generated for video super-resolution processing.

The super-resolution processor 230 super-resolution processes the live video based on the learned super-resolution model. This super-resolution process may be performed frame by frame and may be performed in sequence of the frames of the received live video. In another embodiment of the present disclosure, when a media server can use a plurality of CPUs, distributed super-resolution processing may be performed by dividing each frame to be super-resolution processed, by the number of available GPU resources. In other words, another embodiment can perform the super-resolution process in a distributed mode by allocating a GPU for each divided frame and aggregate the respective results into one super-resolution-processed video. In another embodiment of the present disclosure, the super-resolution model used by the super-resolution processor may be updated in a periodic cycle which may be determined by the epoch period in which the content-adaptive trainer 220 learns.

The live video system 20 according to at least one embodiment of the present disclosure enables the ingest device (or streamer device) to transmit low-resolution live video as the media server performs super-resolution processing. Further, the media server flexibly manages GPU resources used for the content-adaptive trainer 220 and the super-resolution processor 230. As a result, the live video system 20 can provide streaming services of various resolutions that meet the needs of viewers with little power and use of GPU resources.

Figure 3:
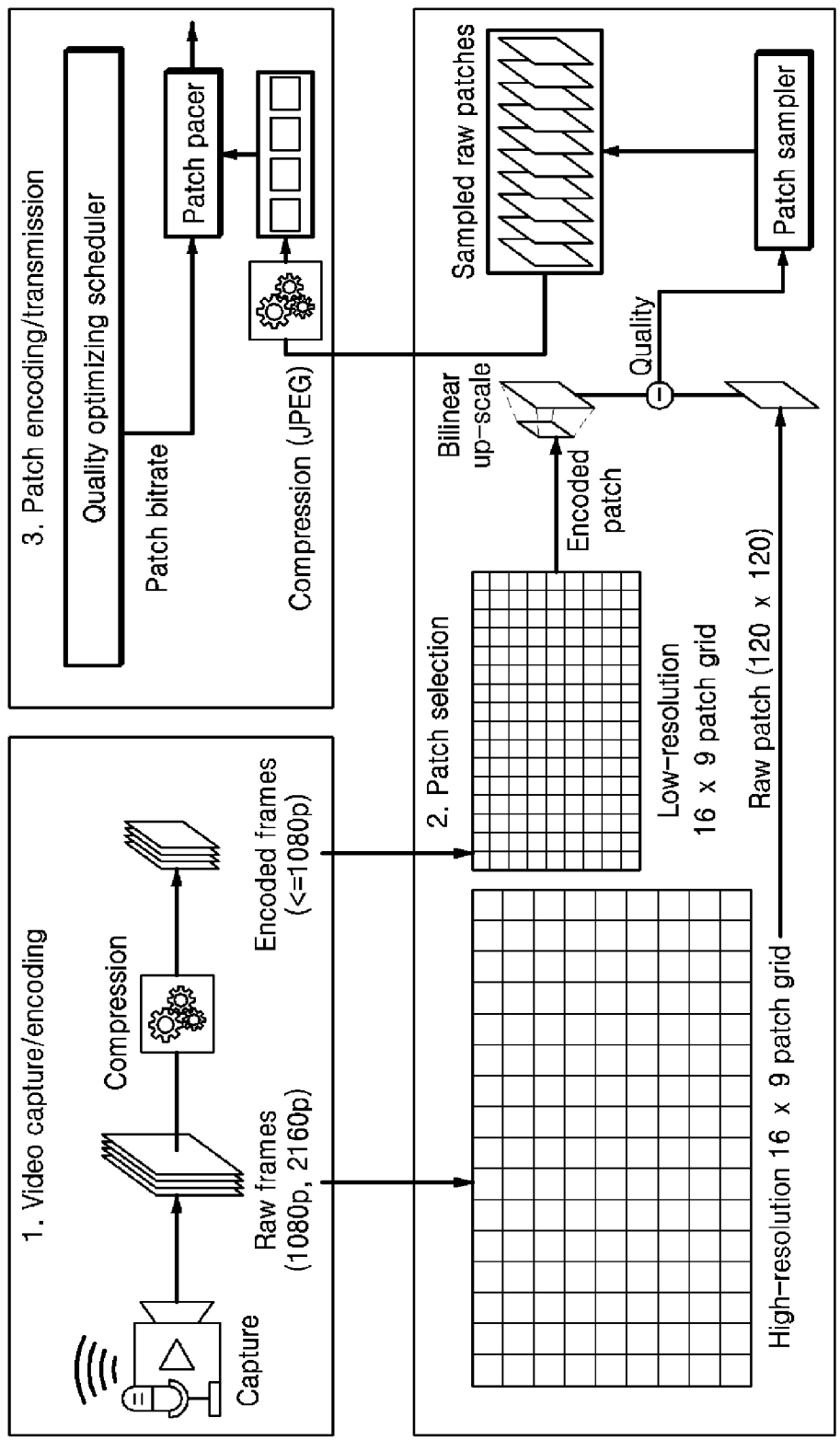
FIG. 3 is a conceptual diagram illustrating a patch selection process according to at least one embodiment of the present disclosure.

FIG. 3 is a conceptual diagram illustrating a patch selection process according to at least one embodiment of the present disclosure.

The live video generated by the streamer's capture tool is generally compressively encoded by the video encoder.

The patch sampler receives the raw frame and the encoded frame of the live video. The patch sampler divides each frame according to a grid and samples patches for respective frame divisions. To obtain the encoding quality (value) of the patch, the patch sampler upscales (e.g., bilinear upscaling) the patch sampled from the encoded frame and calculates the degree of damage corresponding to the patch sampled from the raw frame. The degree of damage may be calculated based on, but not limited to, PSNR or SSIM. The patch sampler determines the actual patches to be transmitted in the order of greater to lesser degrees of damage. Patches to be transmitted in practice are patches sampled from the raw frame.

The patches to be transmitted are compressed and then transmitted to the media server by a patch pacer. At this time, the patches to be transmitted are done so by using the bandwidth divided by a quality optimization scheduler.

Figure 4:
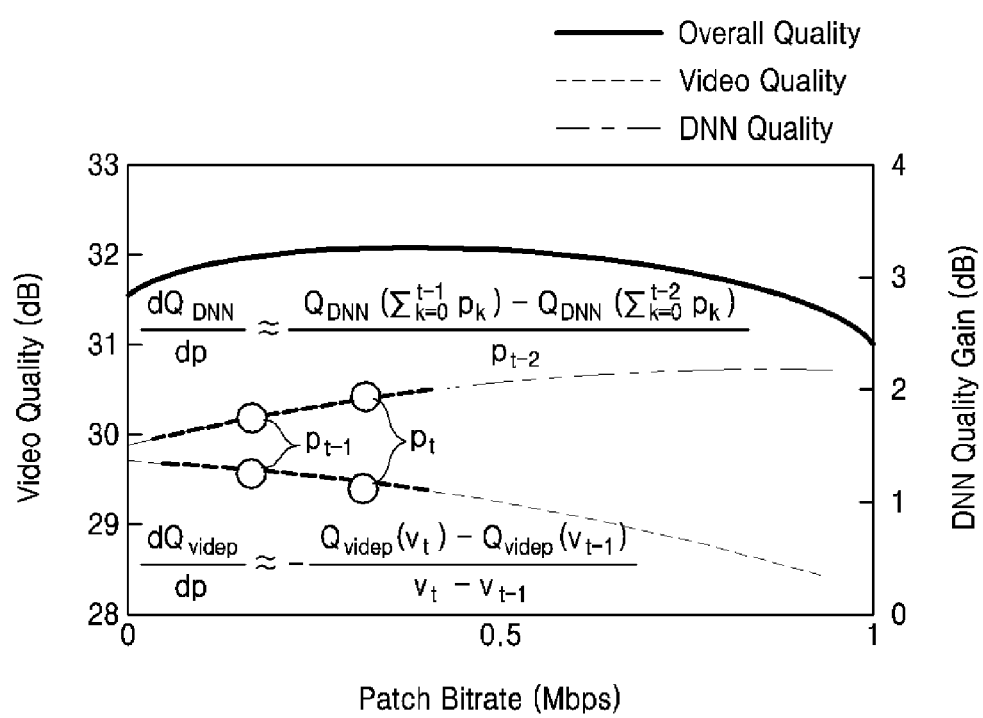
FIG. 4 is a diagram of an example process of calculating an approximate value of an expected quality gain of a super-resolution model according to at least one embodiment of the present disclosure.

FIG. 4 is a diagram of an example process of calculating an approximate value of an expected quality gain of a super-resolution model according to at least one embodiment of the present disclosure.

FIG. 4 shows a graph of a live video quality function (lowest line), a quality gain function (middle line), and a graph of an overall quality (topmost line), a function that is a summation of the two functions. The approximate value of the quality gain function may be obtained by calculating the gradient of the expected quality gain values at the two recent times (t−1, t−2) which were received as feedback from media server to the quality optimization scheduler. One example of calculating the gradient of the expected quality gain values is as shown in Equation 3.

$$\frac{dQ_{DNN}}{dp} \approx \frac{Q_{DNN}\left(\sum_{k=0}^{t-1} P_k\right) - Q_{DNN}\left(\sum_{k=0}^{t-2} P_k\right)}{p_{t-2}} \quad \text{Equation 3}$$

On the other hand, since the encoding quality of the live video is something that could be obtained directly from the ingest device side, it may be obtained by calculating the gradient of the encoding quality values at the two most recent times (t, t−1) inclusive of the present time. One example of calculating the gradient of the encoding quality values is as shown in Equation 4.

$$\frac{dQ_{video}}{dp} \approx \frac{Q_{video}(v_t) - Q_{video}(v_{t-1})}{v_t - v_{t-1}} \quad \text{Equation 4}$$

FIGS. 5A-5F are graphs showing the performance of a live video ingest system for different contents, according to at least one embodiment of the present disclosure.

The performance evaluations in FIGS. 5A-5F exhibit PSNRs (peak-signal-to-noise ratios) of live videos in cases of using, in an environment where bandwidth is limited (10 Mbps or less), the live video ingest system (LiveNas of FIGS. 5A-5F) according to the present disclosure, an offline-based and pre-trained neural network-based super-resolution model (Pre-trained in FIGS. 5A-5C), a generic neural network model (Generic in FIGS. 5A-5F), and vanilla WebRTC (WebRTC in FIGS. 5A-5F). Super-resolution processing was conducted to 1080 p videos from 360 p and 540 p format videos from Twitch, the live streaming platform, and from 720 p and 1080 p format Youtube videos to 4K format, respectively, and two Geforce RTX 2080 Ti were used as the GPUs for the media server to take. PSNR was used as the quality metric.

Figure 5A:
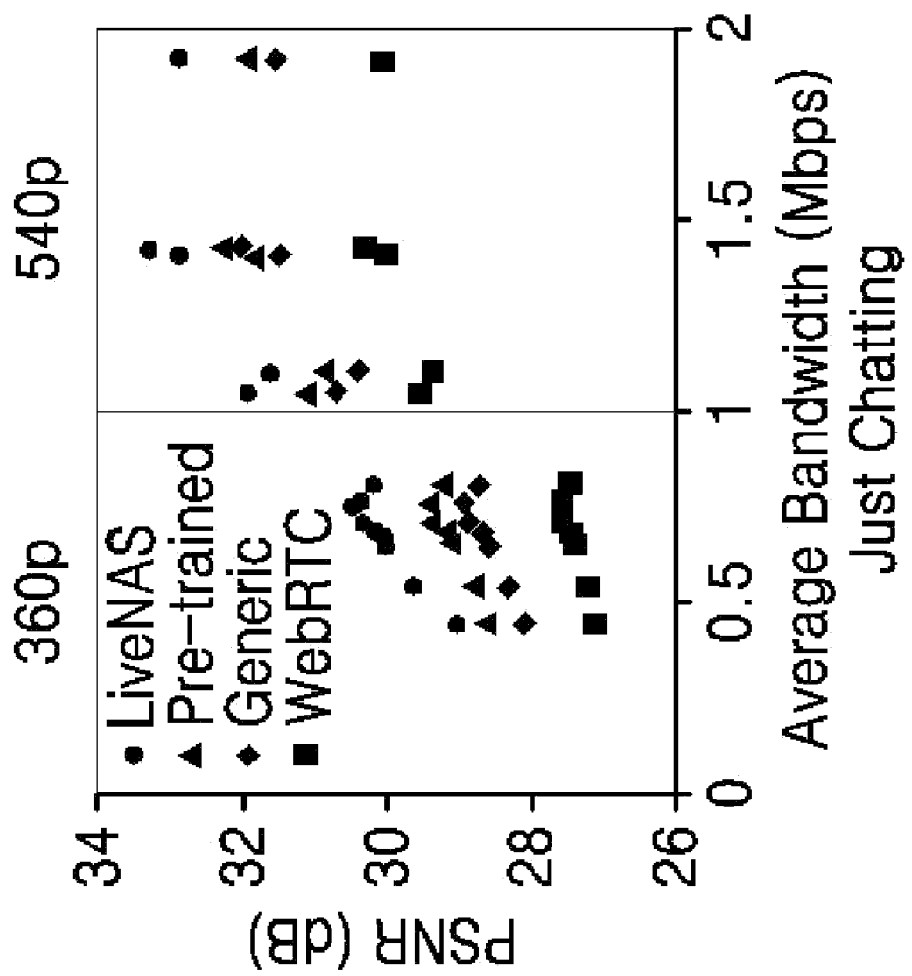
FIGS. 5A-5F are graphs showing the performance of a live video ingest system for different contents, according to at least one embodiment of the present disclosure.
Figure 5B:
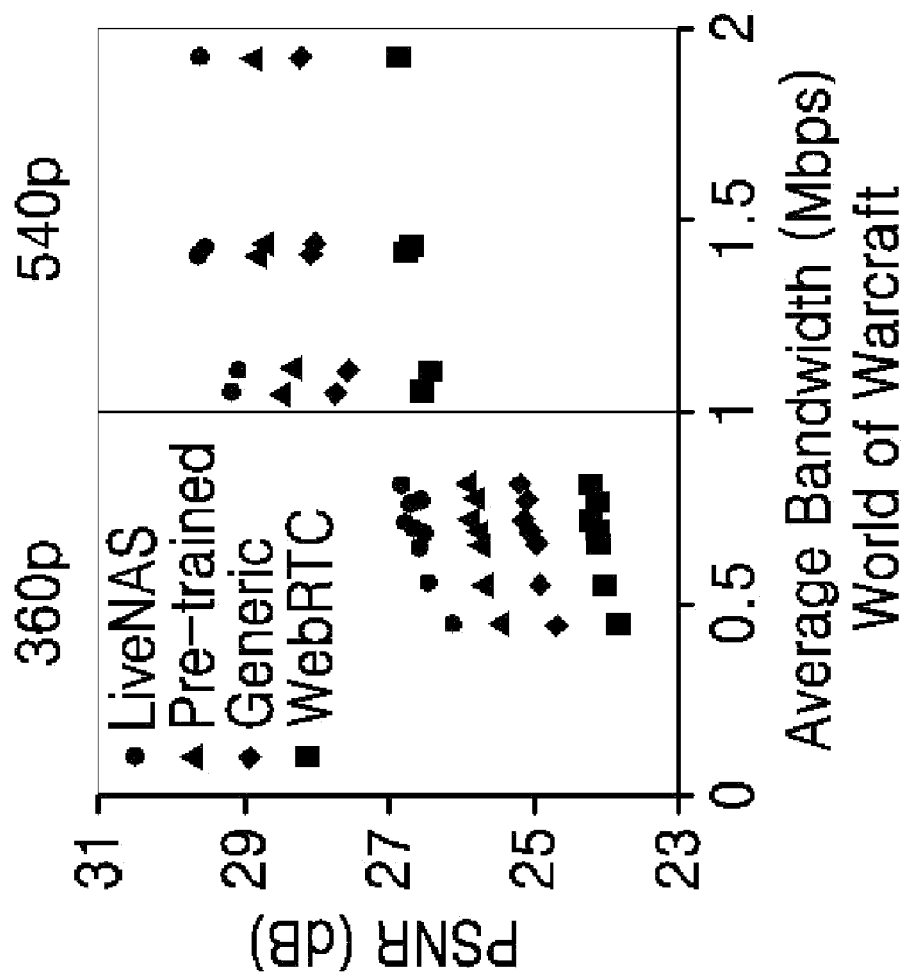
Figure 5C:
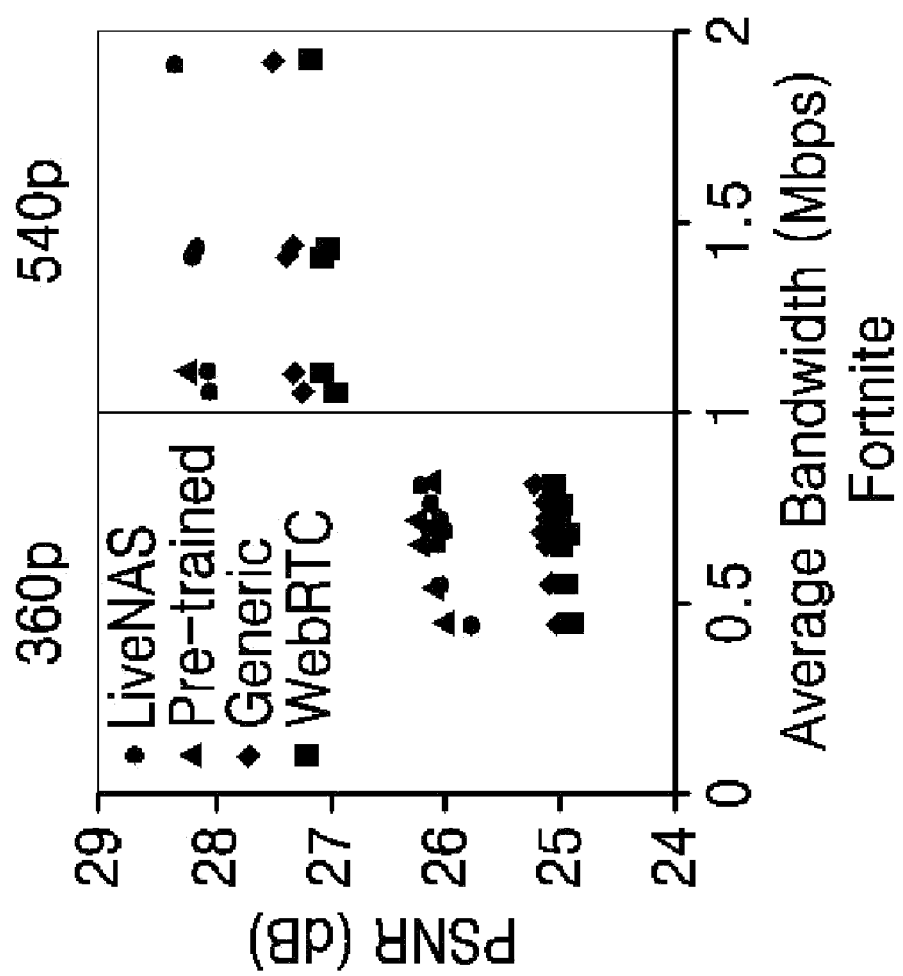

FIGS. 5A-5C show performance graphs of super-resolution-processed three different Twitch videos. As can be seen in FIGS. 5A-5C, when performing the super-resolution process in both 360 p and 540 p formats toward the target resolution, the absolute quality is the highest when using the live video ingest system of the present disclosure.

Figure 5D:
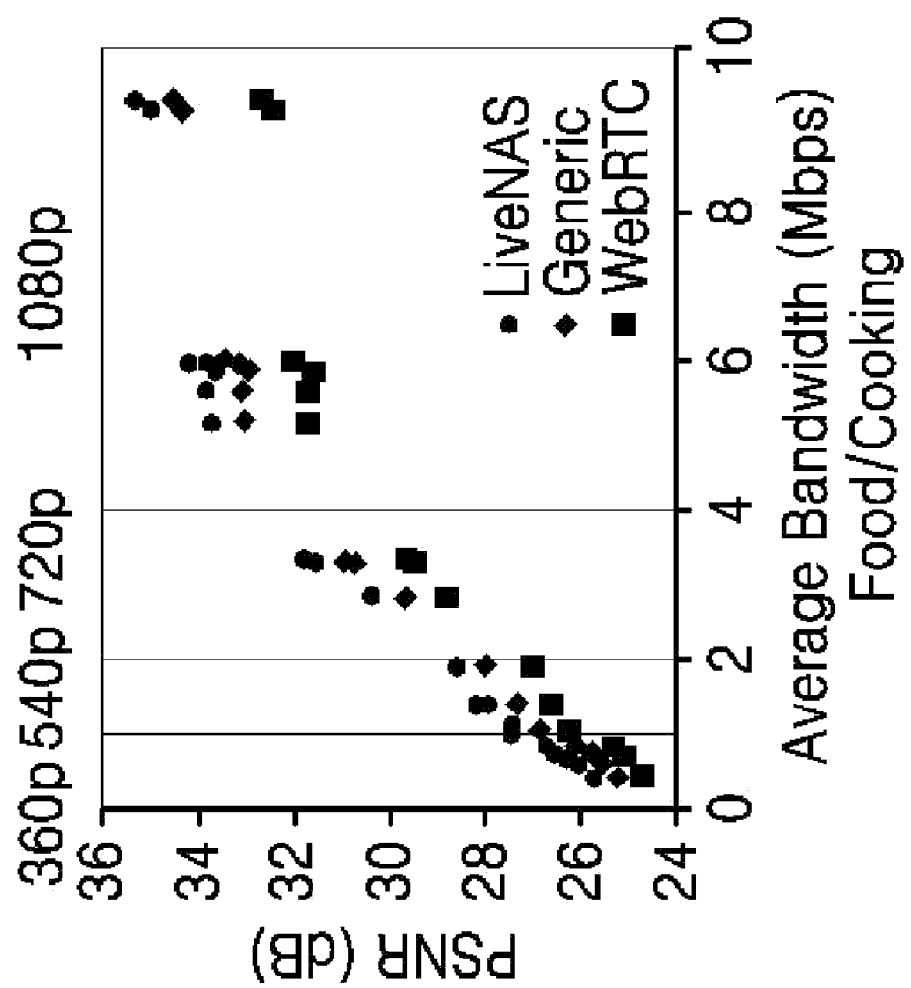
Figure 5E:
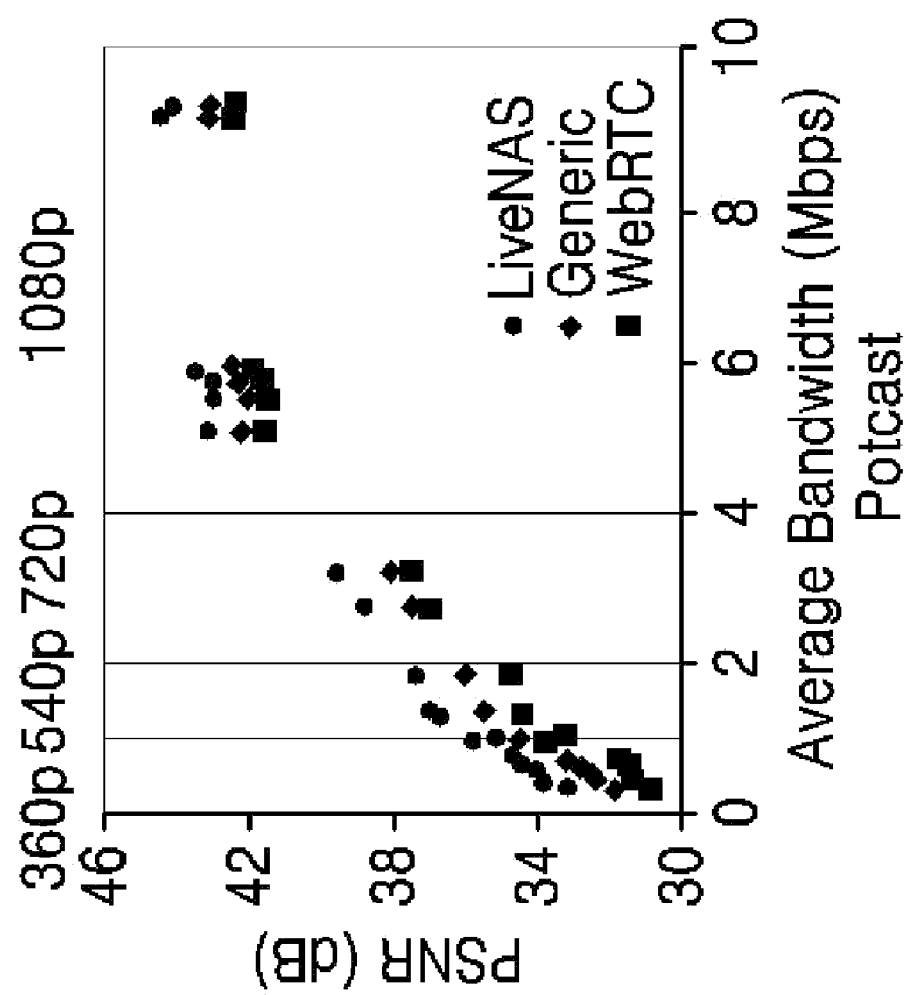
Figure 5F:
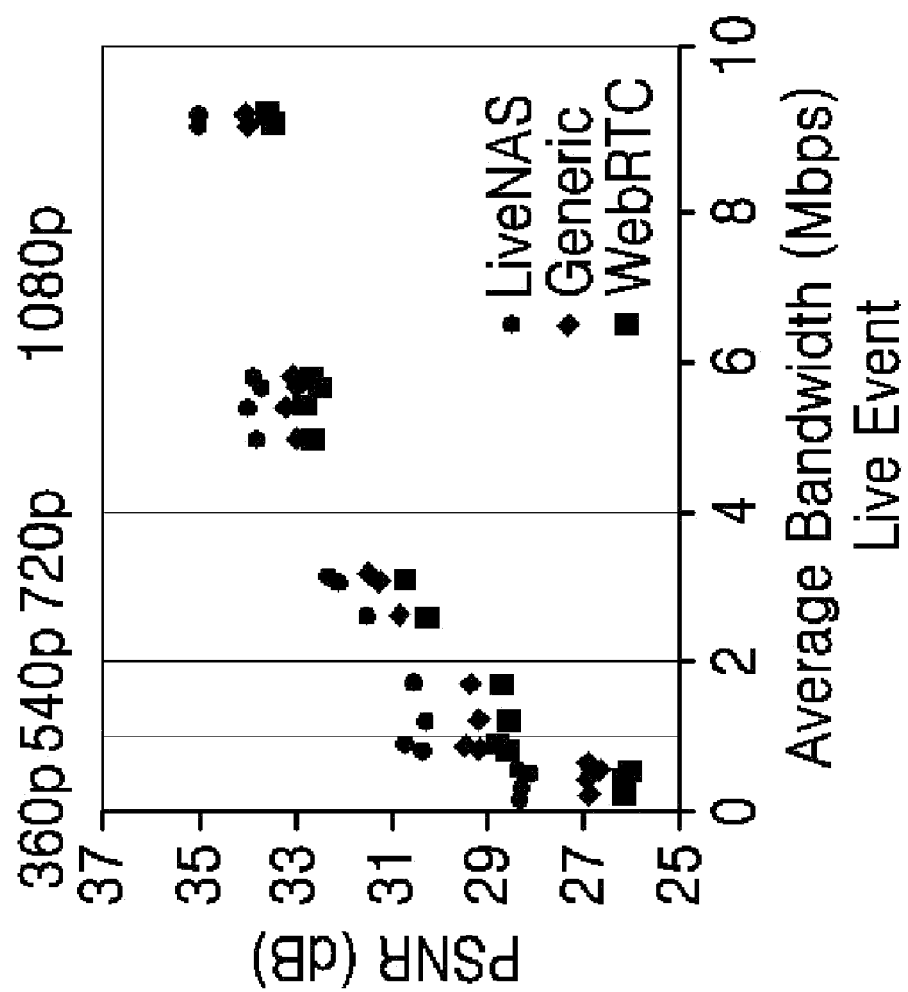

Additionally, FIGS. 5D-5F are performance graphs obtained by super-resolution-processing three different YouTube videos, which exhibit that when performing the super-resolution process in both 720 p and 1080 p formats toward the target resolution, the absolute quality is the highest when using the live video ingest system of the present disclosure.

Using the live video ingest system of the present disclosure exhibited an absolute quality difference that was 0.81 dB to 3.04 dB higher than using vanilla WebRTC and was 0.11 dB to 1.93 dB higher than using the generic neural network model. Compared to when using the pre-trained neural network model, the absolute quality when using the live video ingest system of the present disclosure tended to be 0.6 dB~1.14 dB higher.

Accordingly, it can be seen that in a limited bandwidth environment, the performance of the live video ingest system according to the present disclosure is generally higher than those of the conventional models.

Figure 6:
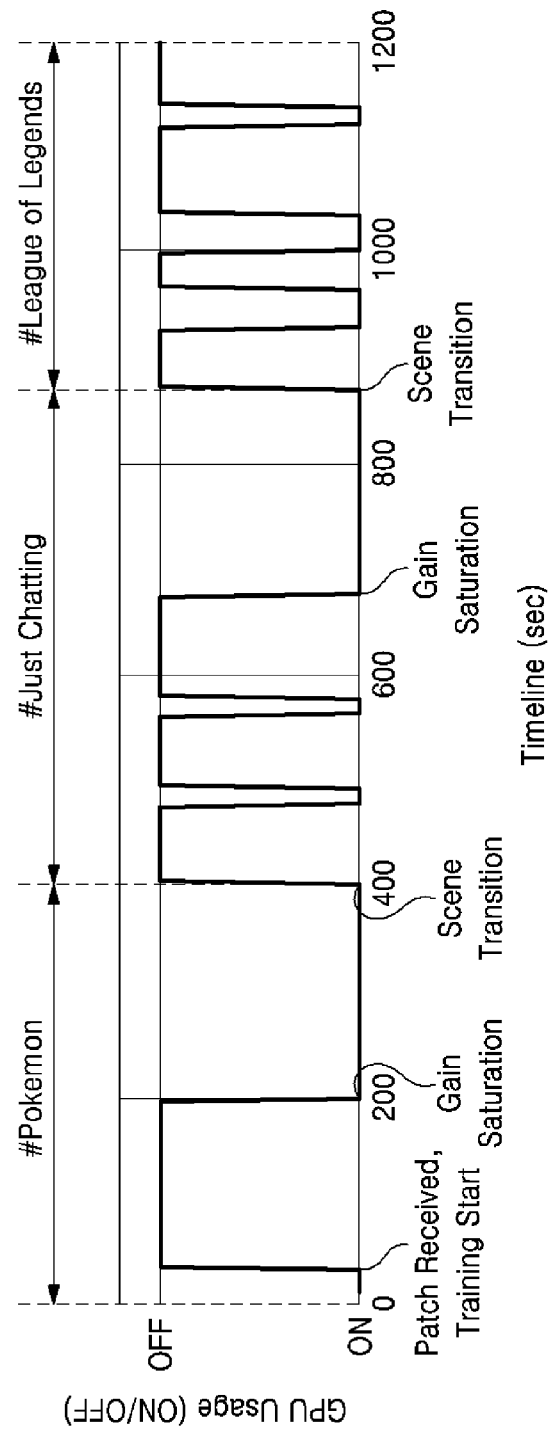
FIG. 6 is a diagram of an example process of detecting quality gain saturation and scene change according to at least one embodiment of the present disclosure.

FIG. 6 is a diagram of an example process of detecting quality gain saturation and scene change according to at least one embodiment of the present disclosure.

FIG. 6 is a graph showing GPU usage for each timeline when the live video ingest system of the present disclosure was used for Twitch broadcasting. FIG. 6 shows that the content-adaptive trainer of the present disclosure adaptively uses a GPU for super-resolution processing of real-time broadcasting. The content-adaptive trainer of at least one embodiment of the present disclosure stops using the GPU as training is suspended at the gain saturation occurring point (t=203 sec, etc.), and it resumes to use the GPU when a scene change occurs (t=400 sec, etc.), which proves the adaptive usage of the GPU to be beneficial exclusively for the learning. Accordingly, the live video ingest system of the present disclosure enables optimal resource use by adaptively using the GPU to fit the situation.

Figure 7A:
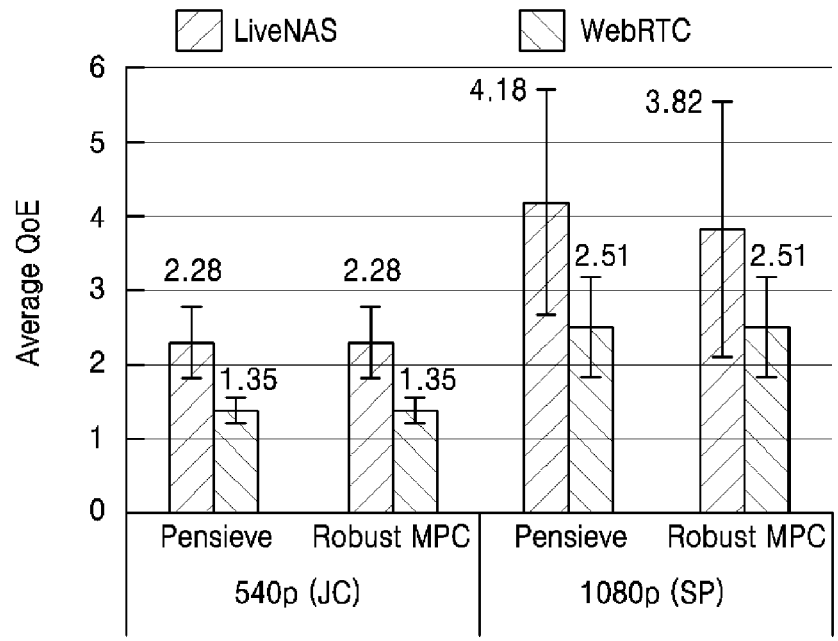
FIGS. 7A and 7B are graphs illustrating the quality of experience (QoE) performances of a live video ingest system according to at least one embodiment of the present disclosure.
Figure 7B:
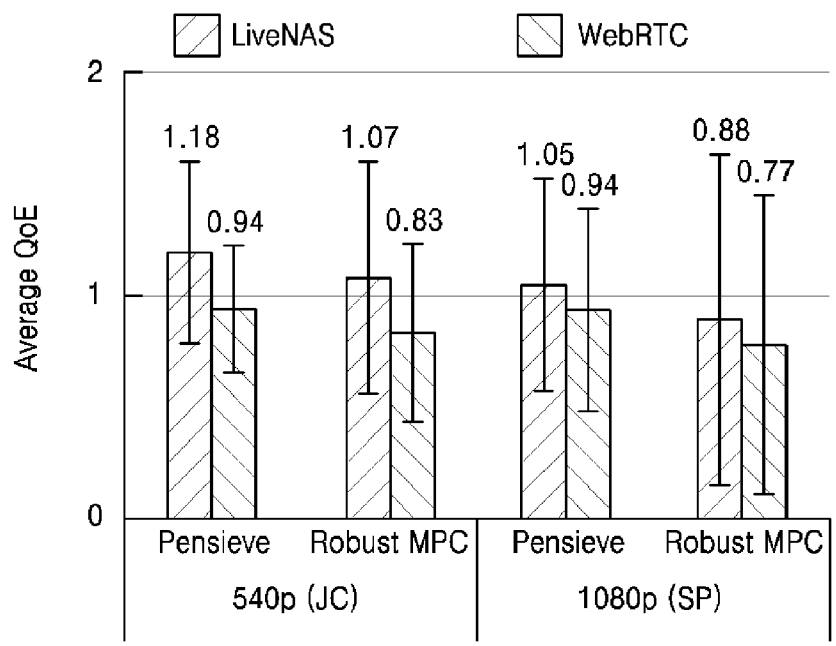

FIGS. 7A and 7B are graphs illustrating the quality of experience (QoE) performances of a live video ingest system according to at least one embodiment of the present disclosure.

The live video ingest system of the present disclosure is a system for an ingest side, yet it enhances the Quality of Experience (QoE) of the distribution side.

FIGS. 7A and 7B show the QoE performances of the live video ingest system of the present disclosure as compared to webRTC based on a conventional adaptive bitrate algorithm (ABR algorithm) used in a viewer terminal.

Here, performance evaluations were conducted on the QoE of the result of super-resolution processing of 540 p Twitch video in the "Just Chatting" category toward a 1080 p format video and on the QoE of the result of super-resolution processing of the 1080 p YouTube video in the "Sports" category toward a 4K format video. The bitrate of each chunk of the video was used to calculate a metric for QoE. Additionally, two network trace data sets were used for performance evaluation. FIG. 7A shows a performance evaluation performed based on a random sampling of 100 downlink traces from the 2019 FCC U.S. broadband traces data set (average bandwidth of 72 Mbps) and FIG. 7B shows a performance evaluation performed based on 3G and wideband traces (average bandwidth of 72 Mbps) used in Pensieve. Additionally, to measure QoE, Pensieve's simulator was used, and the environment setting from Pensieve was also used, to which the conventional ABR algorithm is applied. As the ABR algorithms used for performance evaluation, those of Pensieve and robustMPC (see Non-Patent Document 3) were used, respectively.

FIG. 7A and FIG. 7B shows the average QoEs of respective traces.

As can be seen in FIG. 7A, when performing super-resolution processing from 540p video to 1080p video, the live video ingest system of the present disclosure has improved QoE by 27%-69% compared to that from using WebRTC. Further, as can be seen in FIG. 7B, when performing super-resolution processing from 1080p video to 4K video, the live video ingest system of the present disclosure has improved QoE by 12% to 66% compared to that from using WebRTC. This tells that the QoE performance of the live video ingest system of the present disclosure is consistently better regardless of the ABR algorithm employed by WebRTC.

Such excellent QoE performance is thanks to using the live video ingest system of the present disclosure, which allows transmitting of video chunks of higher resolution to viewers with rich bandwidth and which allows the media server to carry out the super-resolution processing of video chunks, thereby transmitting higher quality chunks.

Figure 8:
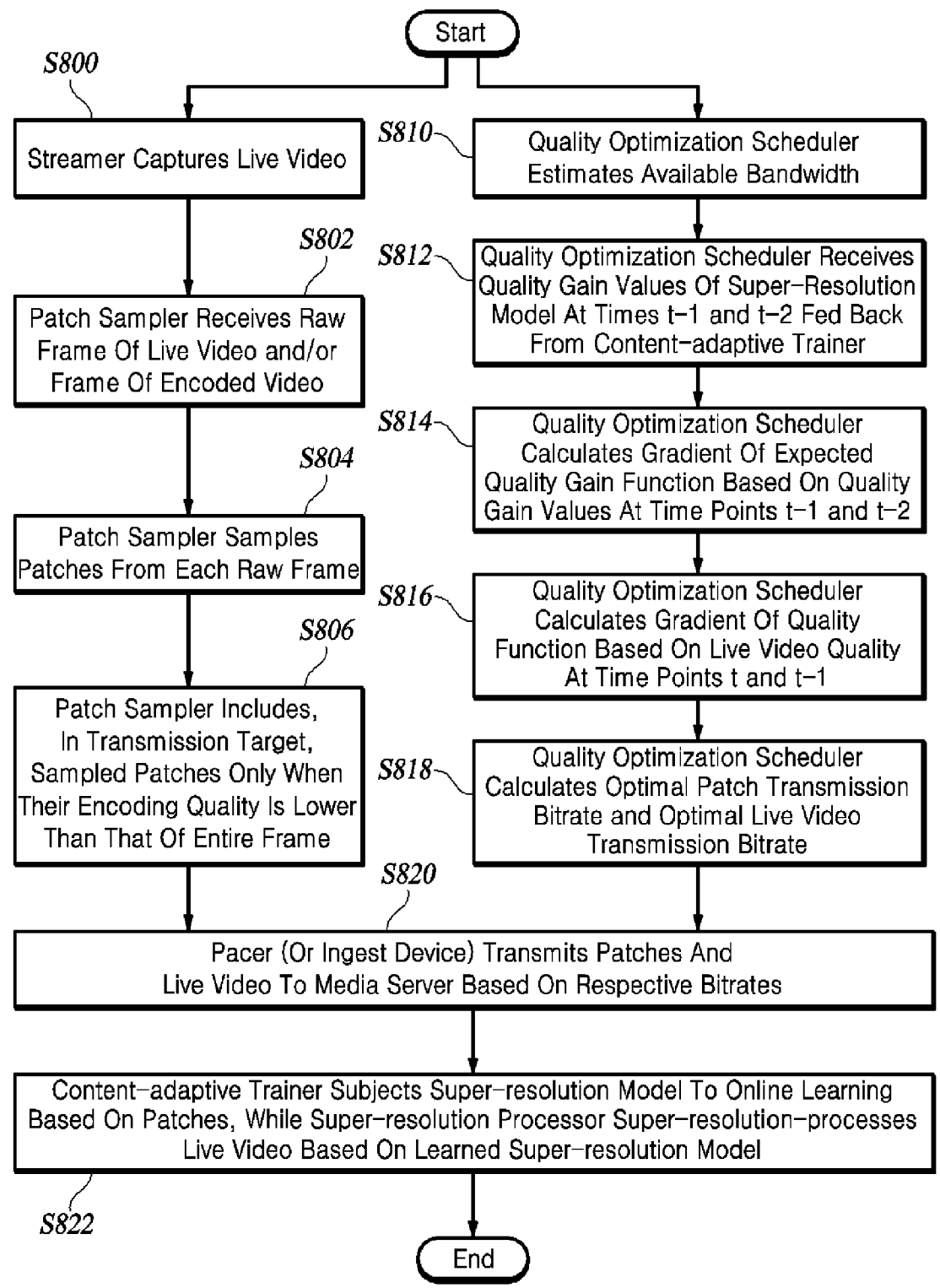
FIG. 8 is a flowchart of a live video ingest process according to at least one embodiment of the present disclosure.

FIG. 8 is a flowchart of a live video ingest process according to at least one embodiment of the present disclosure.

When a streamer generates a live video by using an image capture device such as a camera (S800), a patch sampler receives the raw frame of the live video in real-time (S802). The patch sampler may also receive a frame of an encoded live video to use for a future comparison between the encoding quality of patches and the encoding quality of the entire frame (S802).

The patch sampler samples, from each received raw frame, patches that are a fraction of the entire frame (S804).

The patch sampler compares the encoding quality of the entire frame with that of the sampled patches and includes the sampled patches only when their encoding quality is lower in the transmission target to be transmitted to the media server (S806).

A quality optimization scheduler estimates an available bandwidth in a preset periodic cycle or as necessary regardless of the patch sampler (S810). In particular, Steps S802 to S806 of the patch sampler occur independently from Steps S810 to S816 of the quality optimization scheduler, and both steps may be performed in parallel.

The quality optimization scheduler receives the quality gain values of the super-resolution model at the previous time points (t−1, t−2) from the content-adaptive trainer (S812). This reception of the quality gain may also occur before Step S810, and there may be different occurrences of one step of receiving the quality gain at time t−1 and another step of receiving the quality gain at time t−2. This is because the quality gain is received in a periodic feedback cycle of the quality optimization scheduler.

The quality optimization scheduler calculates a gradient or slope based on the received quality gain values (S814).

The quality optimization scheduler calculates the encoding quality of the live video at time points t and t−1 to obtain a gradient or slope of the quality function (S816). This gradient may be obtained by calculating an average rate of change. However, Step S816 does not necessarily come after Step S814, and both steps may be performed in parallel or may be performed in the reverse order according to the computing resources of the quality optimization scheduler. When performed in the reverse order, Step S812 does not necessarily precede Step S816.

The quality optimization scheduler calculates optimal bitrates for transmitting the patches and live video, respectively, based on the calculations in Steps S814 and S816 (S818).

When the patches and the live video are transmitted to the media server by a pacer or other communication unit of the ingest device (S820), the content-adaptive trainer receives the patches and subjects the super-resolution model to learning, suspends the learning upon detecting a quality gain saturation during the learning, and resumes the learning upon detecting a scene change, thereby training the super-resolution model adaptively to the live video. Parallel to this, the super-resolution processor super-resolution-processes the low-resolution live video received from the ingest device in real-time into a high-resolution video (S822). The super-resolution model used for super-resolution processing the live video is updated periodically or as needed as its learning/training progresses by the content-adaptive trainer.

Although the respective steps in FIG. 8 are described to be sequentially performed, they merely instantiate the technical idea of some embodiments of the present disclosure. Therefore, a person having ordinary skill in the pertinent art could incorporate various modifications, additions, and substitutions in practicing the present disclosure by changing the sequence described by FIG. 8 or by performing one or more of the steps in FIG. 8 in parallel, without departing from the gist and the nature of the at least one embodiment of the present disclosure, and hence the steps in FIG. 8 are not limited to the illustrated chronological sequences.

Figure 9A:
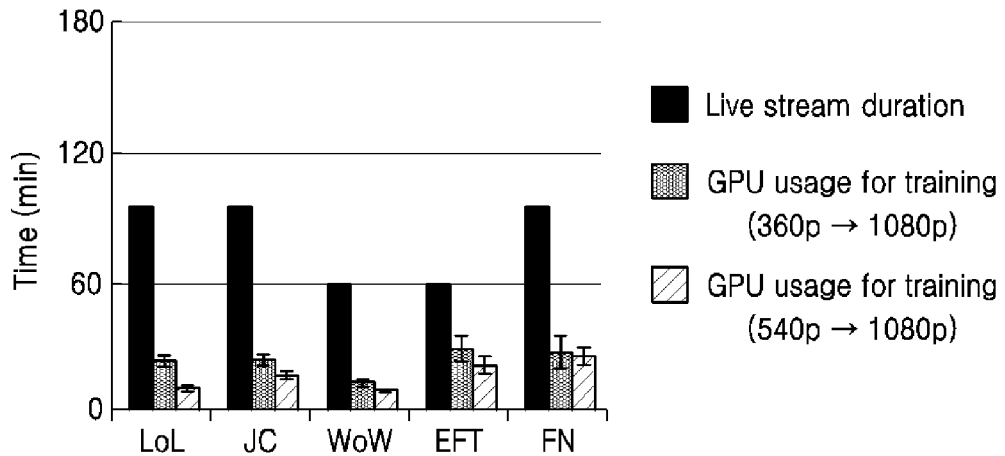
FIGS. 9A, 9B and 9C are graphs showing GPU usage times for training a live video ingest system according to at least one embodiment of the present disclosure.
Figure 9B:
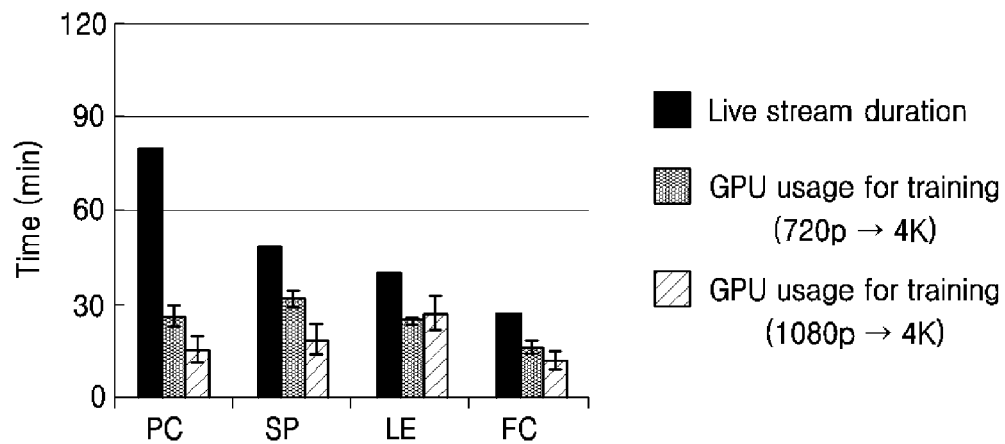
Figure 9C:
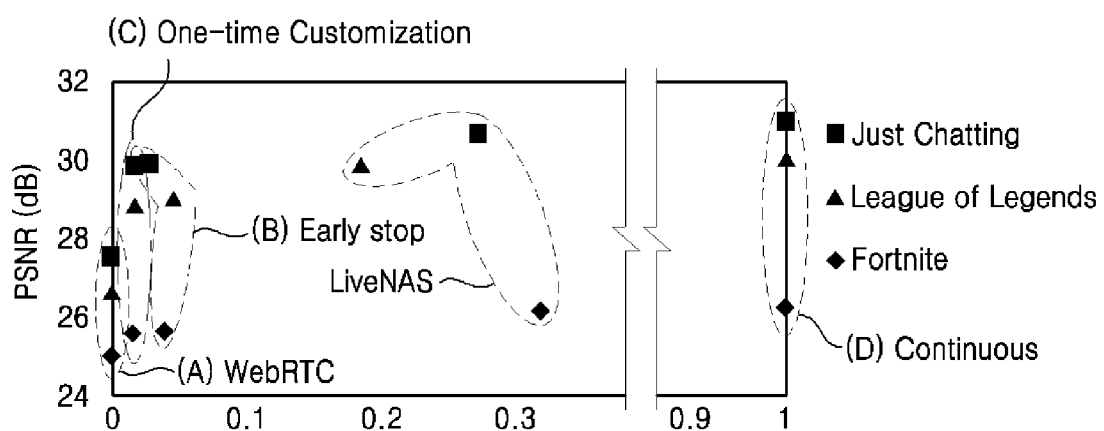

FIGS. 9A, 9B and 9C are graphs showing GPU usage times for a live video ingest system learning according to at least one embodiment of the present disclosure.

FIGS. 9A to 9C illustrate efficient resource usage by a live video ingest system according to at least one embodiment of the present disclosure. FIGS. 9A and 9B show the GPU usage times that are taken for training the live video ingest system compared to the entire streaming duration of the live video. FIG. 9C shows the live video ingest system (LivenNAS) of at least one embodiment in terms of live video quality (PSNR) according to the time of GPU usage for training within the entire streaming duration, to compare the embodiment with when subjecting the generic WebRTC to learning at (A), the deep neural network model to one-time learning at (B), the deep neural network model to first one-time learning at (C), and the deep neural network model to continuous learning without interruption at (D). Here, the one-time learning lasts 60 seconds.

FIG. 9A shows the GPU usage times of the super-resolution model taken for super-resolution processing a 360 p live video and a 540 p live video into 1080 p videos, respectively. FIG. 9B is the GPU usage times taken for super-resolution processing a 720 p live video and a 1080 p live video into 4K videos. As shown in FIGS. 9A and 9B, the GPU usage times taken for training the super-resolution model according to at least one embodiment are only about 35% on average compared to the entire duration of streaming the live video. This time saving means that the content-adaptive trainer has performed adaptive training/learning by reflecting the learning difficulty. As described above, the learning difficulty varies depending on the dynamic degree, length, scaling factor, and the like of the subject video to learn.

As shown in FIG. 9C, the GPU usage time and video quality of the live video ingest system are favorably compared with those of the deep neural network model (D) that has been continuously trained, exhibiting the present live video ingest system taking just about 25% of the GPU usage time to achieve a good video quality as with the deep neural network model (D). Further, the comparison proves the consistent superiority of the video quality of the live video ingest system regardless of the contents over the respective video qualities by WebRTC at (A), the deep neural network model trained at the quality gain saturation point at (B), and the deep neural network model trained at the first one-time learning at (C).

Accordingly, the live video ingest system according to a least one embodiment of the present disclosure can perform high-quality super-resolution processing even with the use of light hardware resources.

Various implementations of the system and method, scheduler, sampler, trainer, processor, and other devices and techniques described herein may be realized by digital electronic circuitry, integrated circuits, field-programmable gate arrays (FPGAs), application-specific integrated circuits (ASICs), computer hardware, firmware, software, and/or their combinations. These various implementations can include those realized in one or more computer programs executable on a programmable system. The programmable system includes at least one programmable processor coupled to receive and transmit data and instructions from and to a storage system, at least one input device, and at least one output device, wherein the programmable processor may be a special-purpose processor or a general-purpose processor. Computer programs, which are also known as programs, software, software applications, or code, contain instructions for a programmable processor and are stored in a "computer-readable recording medium."

The computer-readable recording medium includes any type of recording device on which data that can be read by a computer system are recordable. Examples of the computer-readable recording medium include non-transitory media such as a ROM, CD-ROM, magnetic tape, floppy disk, memory card, hard disk, optical/magnetic disk, storage devices, and the like and transitory medium such as data transmission medium. Further, the computer-readable recording medium can be distributed in computer systems connected via a network, wherein the computer-readable codes can be stored and executed in a distributed mode.

Various implementations of the systems and techniques described herein can be realized by a programmable computer. Here, the computer includes a programmable processor, a data storage system (including volatile memory, nonvolatile memory, or any other type of storage system or a combination thereof), and at least one communication interface. For example, the programmable computer may be one of a server, a network device, a set-top box, an embedded device, a computer expansion module, a personal computer, a laptop, a personal data assistant (PDA), a cloud computing system, or a mobile device.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

The invention claimed is:

1. A live video ingest system for real-time streaming, comprising:
an ingest device configured to generate sampled patches by sampling patches which are a fraction of a frame of a live video generated by an image capture device, and to transmit the sampled patches and the live video by allocating and using a bandwidth for transmitting the sampled patches and a bandwidth for transmitting the live video, respectively; and
a media server configured to receive the sampled patches and the live video from the ingest device, to perform online-learning, based on the sampled patches, on a deep neural network-based super-resolution model, and to use the super-resolution model for super-resolution processing the live video into a super-resolution live video,
wherein based on the sampled patches having an encoding quality lower than the frame, the sampled patches are included in a transmission target to be transmitted to the media server,
wherein the media server comprises a super-resolution processor configured to use the super-resolution model for performing the super-resolution processing on the live video into the super-resolution live video, and
wherein the super-resolution processor is operable when graphics processing unit (GPU) resources of a plurality of GPUs are available for the media server to use, to perform a distributed super-resolution process on the super-resolution model by dividing each frame of the live video to be super-resolution-processed by a count of the GPU resources into divided frames and allocating the GPU resources to each of the divided frames.

2. The live video ingest system of claim 1, wherein the ingest device comprises:
a patch sampler configured to sample, from a raw frame of the live video, patches which are a fraction of the raw frame, and
a quality optimization scheduler configured to allocate all or part of an available bandwidth as the bandwidth for transmitting the sampled patches and the bandwidth for transmitting the live video; and
wherein the media server comprises:
a content-adaptive trainer configured to subject the super-resolution model to the online learning by using the sampled patches as ground truth.

3. The live video ingest system of claim 2, wherein the patch sampler comprises:
a video receiver configured to receive the live video from an image capture device of the ingest device; and
a sampling unit configured to sample one or more patches from the raw frame of the live video received from the video receiver based on a grid of entire frame.

4. The live video ingest system of claim 3, wherein the patch sampler further comprises:
a patch manager configured to be responsive to when the sampled patches have the encoding quality lower than the raw frame corresponding to the sampled patches for including the sampled patches in the transmission target to be transmitted to the media server.

5. The live video ingest system of claim 4, wherein the patch manager is configured to use a peak-signal-to-noise ratio (PSNR) or a structural similarity index measure (SSIM) as the encoding quality.

6. The live video ingest system of claim 4, wherein the patch manager is configured to repeatedly perform patch sampling until a count of the patches included in the transmission target reaches a preset minimum number of patches.

7. The live video ingest system of claim 3, wherein a sampled patch of the one or more sampled patches contains a timestamp and information of a location on a grid.

8. The live video ingest system of claim 2, wherein the quality optimization scheduler comprises:
a bandwidth measurer configured to estimate the available bandwidth; and
a bandwidth allocator configured to allocate all or part of the available bandwidth by calculating the bandwidth for transmitting the sampled patches and the bandwidth for transmitting the live video.

9. The live video ingest system of claim 8, wherein the bandwidth allocator is configured to allocate the available bandwidth based on an encoding quality of the live video or an expected quality gain of the super-resolution model.

10. The live video ingest system of claim 9, wherein the bandwidth allocator is configured to obtain the expected quality gain based on a quality gain fed back from the content-adaptive trainer.

11. The live video ingest system of claim 10, wherein the bandwidth allocator receives the quality gain fed back from the content-adaptive trainer in a periodic cycle that is set based on an epoch for subjecting the super-resolution model to the online learning.

12. The live video ingest system of claim 9, wherein the bandwidth allocator is configured to obtain the encoding quality of the live video by obtaining encoding qualities of a Group of Pictures (GoP) of an encoded live video and calculating an average of the encoding qualities of the GoP.

13. The live video ingest system of claim 9, wherein the bandwidth allocator is configured to obtain the encoding quality of the live video by scaling a normalized quality curve of contents similar to the live video.

14. The live video ingest system of claim 2, wherein the content-adaptive trainer is configured to train the super-resolution model by giving a larger weight to a preset number of most recent patches relative to other remaining patches, among the sampled patches.

15. The live video ingest system of claim 2, wherein the content-adaptive trainer is operable when graphics processing unit (GPU) resources of a plurality of GPUs are available for the media server to use, to subject the super-resolution model to a distributed learning by generating patch groups with the sampled patches being grouped in an order of arrival at the media server and allocating the GPU resources to the patch groups, respectively.

16. The live video ingest system of claim 2, wherein the content-adaptive trainer further comprises:
a saturation detector configured to detect a quality gain saturation by monitoring a quality gain of the super-resolution model dependent on the training; and
a learning unit configured to train the super-resolution model in consideration of the quality gain saturation.

17. The live video ingest system of claim 16, wherein
the saturation detector is configured to determine that the quality gain saturation is present when a difference between quality gains of the super-resolution model at two most recent points in time is equal to or less than a preset gain saturation limit and falls below the preset gain saturation limit at such frequency or number of times that exceed a preset saturation count;
the learning unit is configured to be responsive to a saturated quality gain for suspending training of the super-resolution model; and
the quality optimization scheduler is configured to be responsive to a suspension of the training of the super-resolution model for setting the bandwidth for transmitting the sampled patches to a preset minimum bandwidth.

18. The live video ingest system of claim 16, wherein the content-adaptive trainer further comprises:
a change detector configured to detect a scene change of the live video.

19. The live video ingest system of claim 18, wherein
the change detector is configured to determine that the scene change is present when a difference between a most recent quality gain and an initial quality gain of the super-resolution model is equal to or less than a preset learning limit and falls below the preset learning limit at such frequency that exceeds a preset learning count;
the learning unit is configured to be responsive to a saturated quality gain and the scene change of the live video for resuming the training of the super-resolution model; and
the quality optimization scheduler is configured to be responsive to the training of the super-resolution model being performed upon resumption after a suspension for setting the bandwidth for transmitting the sampled patches to a preset minimum bandwidth.

20. The live video ingest system of claim 2, wherein the super-resolution processor is further configured to use the super-resolution model for performing the super-resolution processing on each of frames of the live video in an order of the frames.

21. A live video ingest method performed by a live video ingest system for real-time streaming, the live video ingest method comprising:
capturing a live video by an image capture device;
receiving, by an ingest device, one or more raw frames of the live video from the image capture device and sampling, by the ingest device, a fraction of a raw frame of the one or more raw frames as patches;
allocating, by the ingest device, all or part of an available bandwidth as a bandwidth for transmitting sampled patches and a bandwidth for transmitting the live video, respectively;
receiving, by a media server, the live video and the sampled patches from the ingest device;
training, by the media server, a deep neural network-based super-resolution model by subjecting the super-resolution model to an online learning by using the sampled patches as ground truth; and
performing, by the media server, a super-resolution process on the live video into a super-resolution live video by using the super-resolution model,
wherein based on the sampled patches having an encoding quality lower than the raw frame, the sampled patches are included in a transmission target to be transmitted to the media server, and
wherein the performing of the super-resolution process comprises:
when graphics processing unit (GPU) resources of a plurality of GPUs are available for the media server to use, performing a distributed super-resolution process by dividing each frame of the live video to be super-resolution-processed by a count of the GPU resources into divided frames and allocating the GPU resources to each of the divided frames.

22. The live video ingest method of claim 21, wherein the sampling of the fraction of the raw frame as the patches comprises:
sampling, in the one or more raw frames of the live video, the patches based on a grid of entire frame.

23. The live video ingest method of claim 21, wherein the allocating of all or part of the available bandwidth comprises:
performing a bandwidth allocation based on an encoding quality of the live video or an expected quality gain of the super-resolution model.

24. The live video ingest method of claim 21, wherein the training of the super-resolution model comprises:
training the super-resolution model adaptively by detecting a saturation of a quality gain of the super-resolution model dependent on the training or by detecting a scene change of the live video.

25. A non-transitory computer-readable medium comprising instructions which, when executed by at least one processor, cause the at least one processor to:
- capture a live video by an image capture device;
- receive, by an ingest device, one or more raw frames of the live video from the image capture device and sampling, by the ingest device, a fraction of a raw frame of the one or more raw frames as patches;
- allocate, by the ingest device, all or part of an available bandwidth as a bandwidth for transmitting sampled patches and a bandwidth for transmitting the live video, respectively;
- receive, by a media server, the live video and the sampled patches from the ingest device;
- train, by the media server, a deep neural network-based super-resolution model by subjecting the super-resolution model to an online learning by using the sampled patches as ground truth; and
- perform, by the media server, a super-resolution process on the live video into a super-resolution live video by using the super-resolution model,
- wherein based on the sampled patches having an encoding quality lower than the raw frame, the sampled patches are included in a transmission target to be transmitted to the media server, and
- wherein the performing of the super-resolution process comprises:
- when graphics processing unit (GPU) resources of a plurality of GPUs are available for the media server to use, performing a distributed super-resolution process by dividing each frame of the live video to be super-resolution-processed by a count of the GPU resources into divided frames and allocating the GPU resources to each of the divided frames.

* * * * *